Nov. 1, 1932.   J. A. FLINT ET AL   1,886,174
APPARATUS FOR THE WET SCREENING OR SEPARATION OF INTERMIXED MATERIALS
Filed Jan. 10, 1929   6 Sheets-Sheet 1
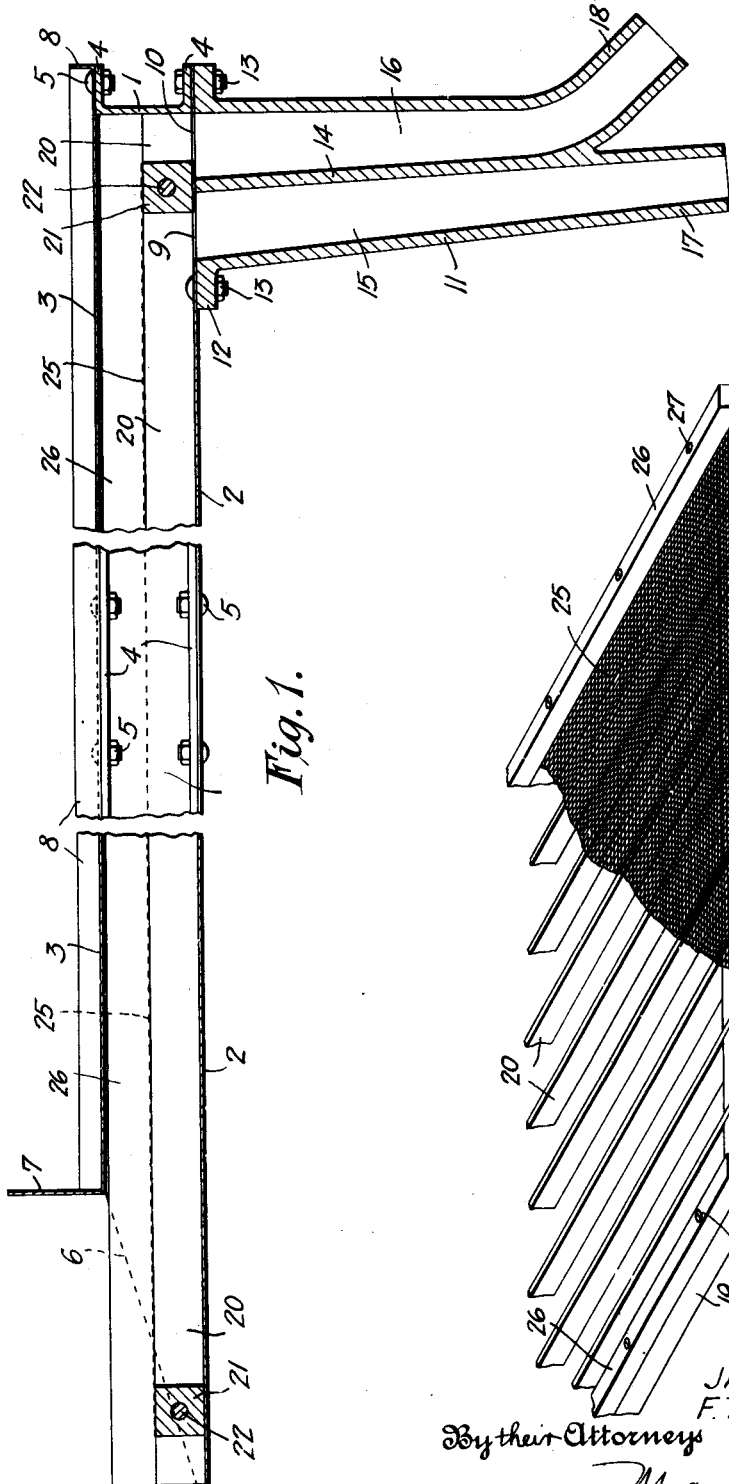
Inventors
JAMES A. FLINT.
F. T. HAZELTINE.
By their Attorneys

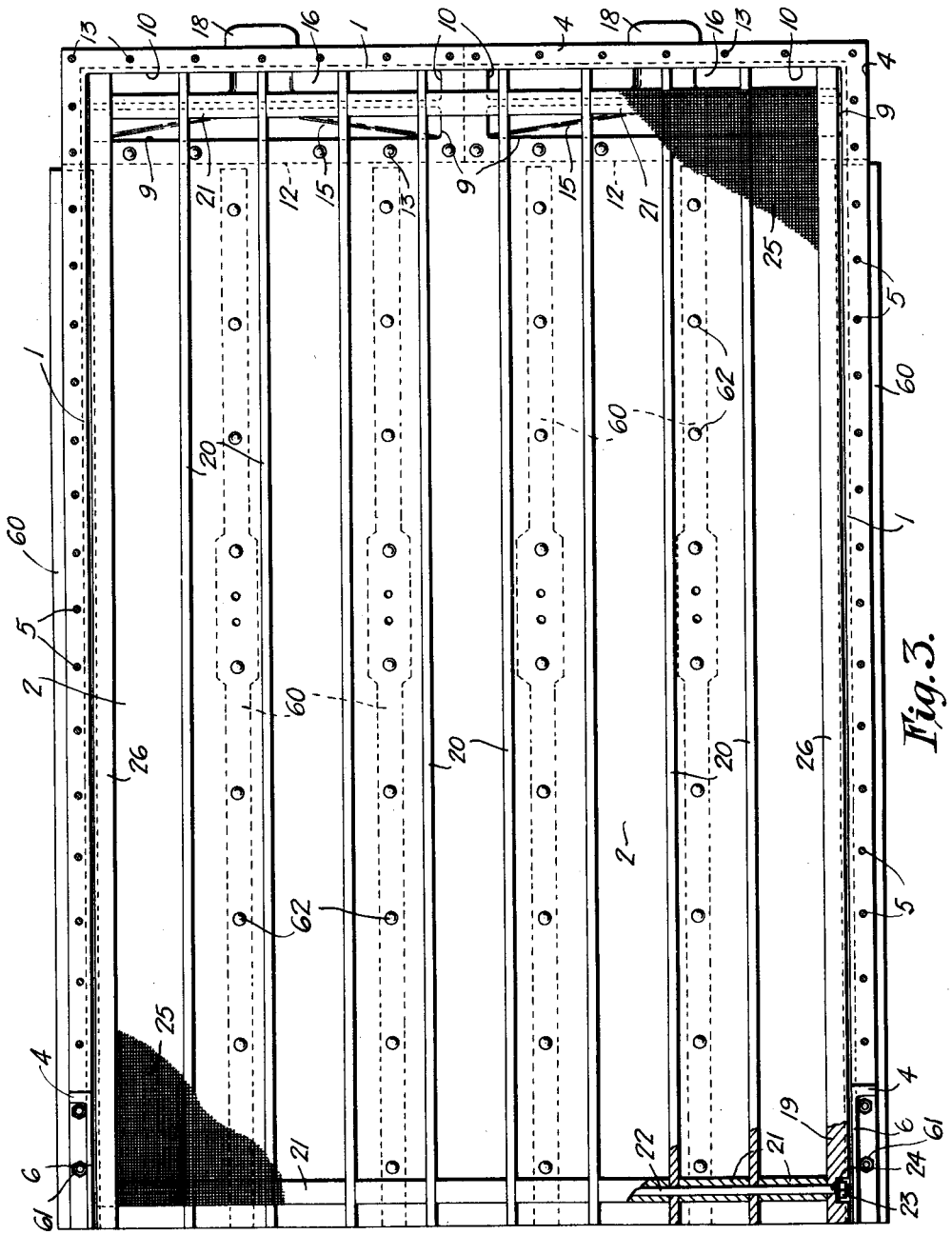

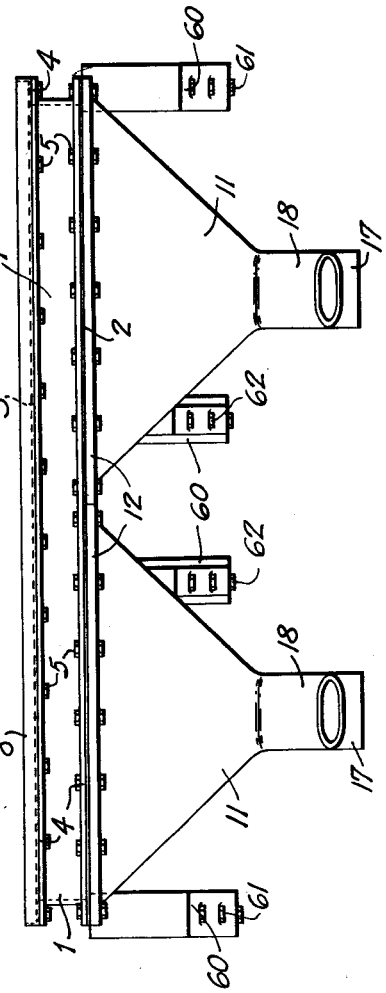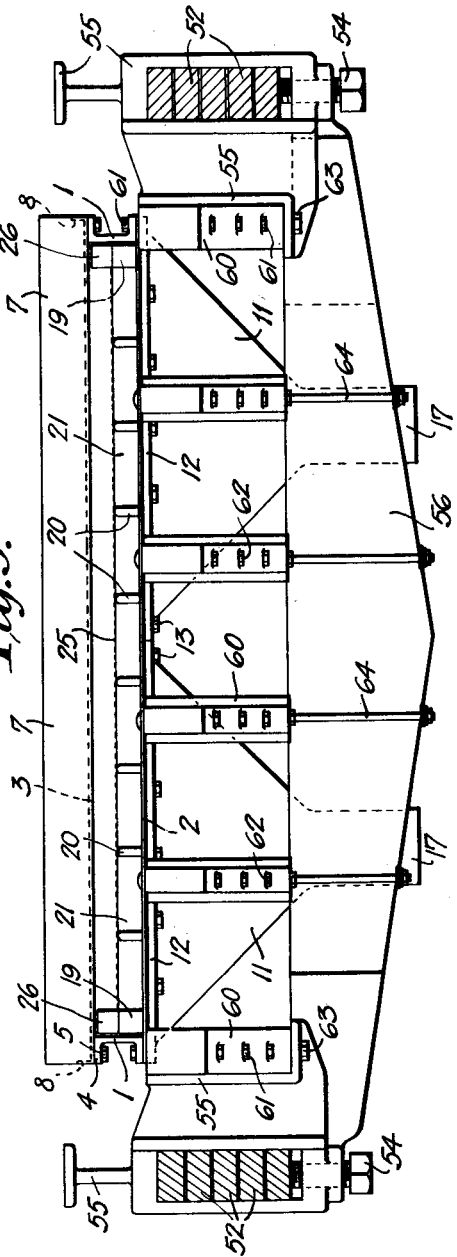

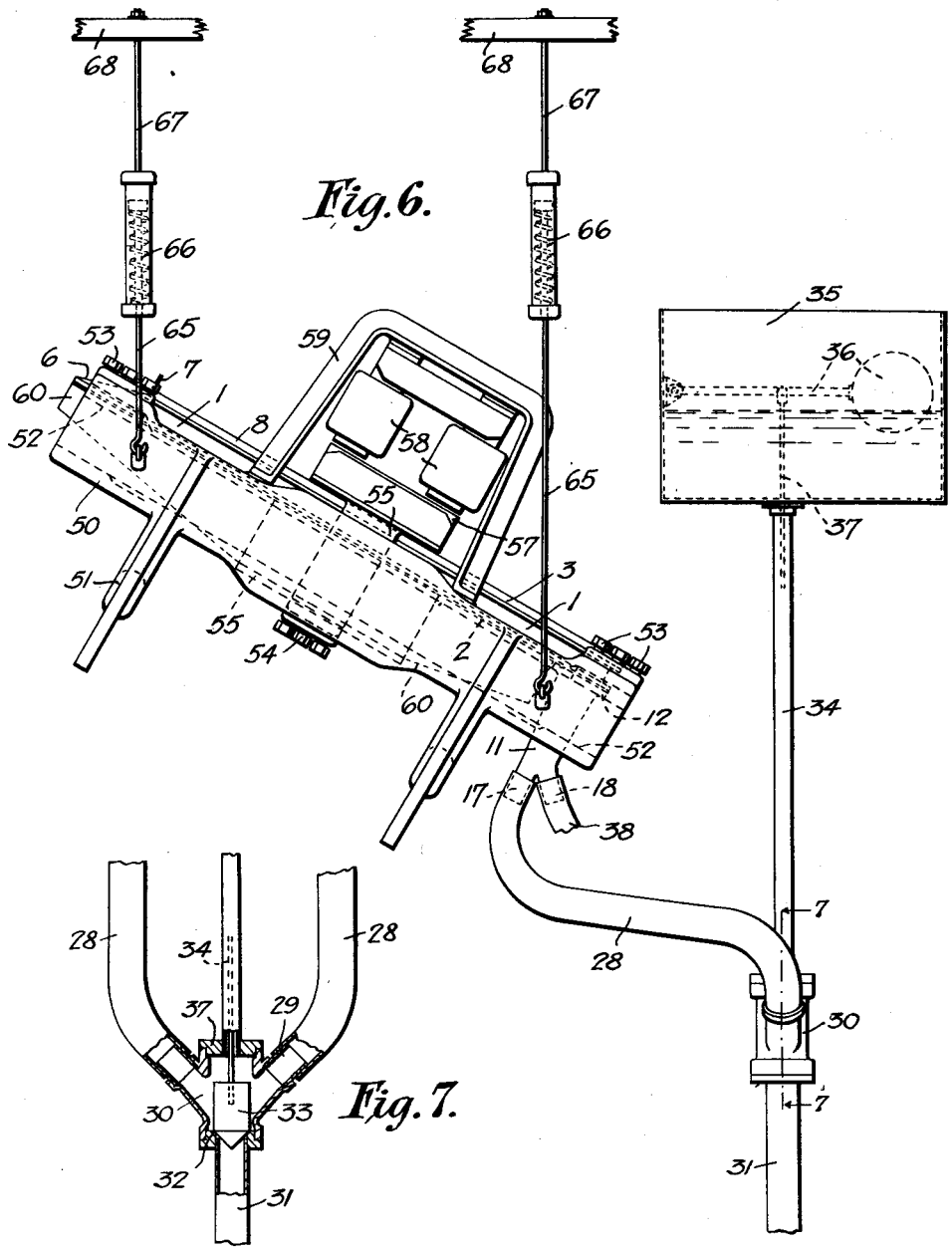

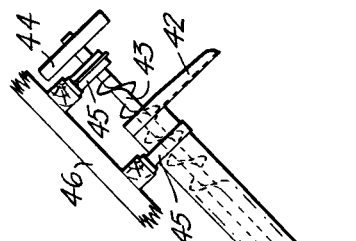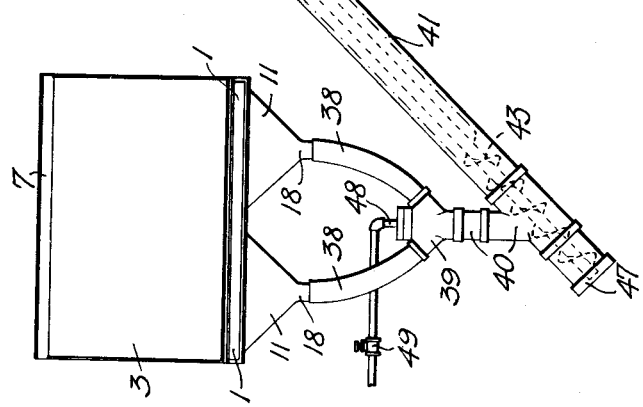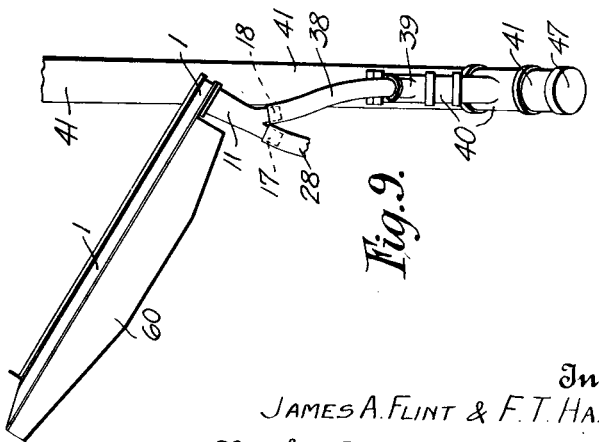

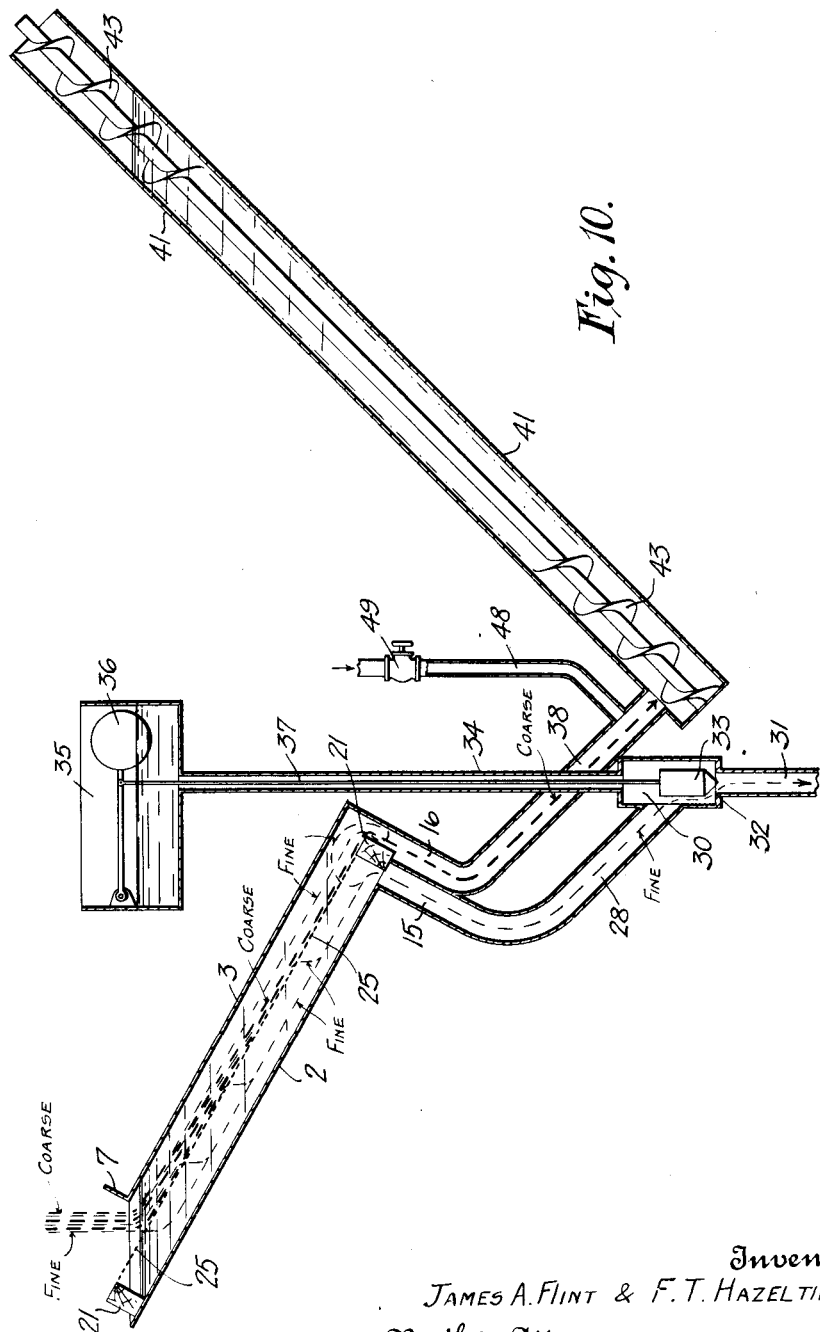

Patented Nov. 1, 1932

1,886,174

UNITED STATES PATENT OFFICE

JAMES A. FLINT AND FRANCIS T. HAZELTINE, OF DENVER, COLORADO, ASSIGNORS TO THE TRAYLOR VIBRATOR COMPANY, OF DENVER, COLORADO, A CORPORATION OF COLORADO

APPARATUS FOR THE WET SCREENING OR SEPARATION OF INTERMIXED MATERIALS

Application filed January 10, 1929. Serial No. 331,492.

This invention relates to an improved apparatus for the wet screening or separation of intermixed materials, and particularly for the treatment of pulp mixtures of various sizes of materials in a liquid medium, such as water, to separate such mixtures into undersize materials and oversize materials according to the size of mesh or degree of perviosity of the perforate screen surface employed in the screening operation.

The object of the invention is to provide an improved apparatus by the use of which the screening or separation of the materials may be quickly and effectively carried out, and the meshes or perforations of the screening surface at all times maintained clean and free from blinding.

According to the invention the screening or separating operation is effected within a screening compartment or water box which is filled, or substantially filled, with a liquid medium, such as water, so that a body of liquid is confined between the opposite, or upper and lower walls, of the compartment. The screening surface or cloth is positioned intermediate and parallel to said walls within said body of liquid, and it is mounted or held loosely or otherwise within said compartment, so that it shall be capable of movement toward and from the compartment walls. Vibratory motion is imparted bodily to the screening compartment and to the body of liquid therein, at substantially right angles to the plane of the screening surface, with the result that the screening surface also receives a vibratory motion, which due to inertia and resistance is different from or lags with respect to that of the liquid. Consequently a pulsating action of the liquid occurs in opposite directions through the screening surface, which has the effect of causing or assisting in the passage of the undersize materials through said screening surface, and also of keeping the meshes or perforations of said surface clean and free from blinding, so that there is no possibility of the screening operation being interrupted.

Also, according to the invention, the screening or separating operating is carried out within a screening compartment as above set forth, and in which provision is made for the production of a positive downward current of liquid in the compartment and through the screening surface, whereby those undersize materials which would not otherwise settle down quickly enough, or would remain in suspension, are carried down on to and through the screen cloth and outwardly through the undersize outlet connections.

Furthermore, to prevent a downward current of liquid in the oversize outlet connections, and to prevent escape of undersize materials through said connections, provision is made for the production of a current of liquid through said oversize connections in counterflow to the movement of oversize material therethrough, whereby any undersize material entering such connections is carried back to the screening compartment and held therein until it passes through the screening surface and out through the undersize connections.

The invention is not, of course, restricted to its use in the treatment of any particular kind or nature of materials, as it may be employed in the separation of any and all classes or kinds of intermixed materials or pulp mixtures capable of being separated or screened by the wet screening process.

The accompanying drawings illustrate in a somewhat diagrammatic manner, a form of screening or separating apparatus constructed in accordance with the present invention.

In these drawings:—

Figure 1 is a view, partially broken away, and mainly in longitudinal section, of the screening compartment or water box, with the screen frame in place therein;

Figure 2 is an isometric view, on a reduced scale with respect to Figure 1, of one end of the screen frame;

Figure 3 is a plan view, on a reduced scale with respect to Figure 1, of the screening compartment or water box, with the top or cover plate thereof removed;

Figure 4 is an end elevational view of the screening compartment or water box, looking toward the lower or right hand end thereof as shown in Figures 1 and 3, the figure being on the same scale as Figure 3;

Figure 5 is an end elevational view, on the same scale as Figures 3 and 4, of the screening compartment or water box, looking toward the upper or left hand end thereof as shown in Figures 1 and 3, and also showing part of the vibrating means;

Figure 6 is a side elevational view, on a reduced scale with respect to the preceding figures, showing the screening compartment in the inclined operative position thereof, also illustrating the vibrating means and the outlet connections for the undersize materials, the outlet connections for the oversize materials being omitted for the sake of clearness;

Figure 7 is a detail view, mainly in section, taken along the line 7—7 of Figure 6 and looking in the direction of the arrows, of part of the undersize outlet connections;

Figure 8 is an end elevational view, on a further reduced scale, of the screening compartment, and mainly intended to illustrate the outlet connections for the oversize materials, the outlet connections for the undersize materials being omitted for the sake of clearness;

Figure 9 is a side elevational view corresponding to Figure 8; and

Figure 10 is a general diagrammatic view intended merely to illustrate the operation of the apparatus.

The complete screening apparatus is illustrated in the drawings, comprises a screening compartment or water box, within which the screening or separation of the materials is effected; a vibrating means for effecting vibratory movement of said screening compartment; undersize outlet connections for the delivery of the undersize materials such as the slimes and fines; and oversize outlet connections for the delivery of oversize materials such as the sands, or even larger particles.

The screening compartment is in the form of a relatively long and wide box-like structure of relatively small height, which is supported, as hereinafter described, in a longitudinally inclined position, as shown in Figures 6, 8 and 9. This box-like structure, as shown, comprises a channel member or members 1 extending about the two sides and the lower end of the structure, a bottom plate 2, and a top or cover plate 3, the plates 2 and 3 being secured at their side and lower edges to the outwardly directed flanges 4 of the channel member 1 in any suitable manner, for example, by means of bolts 5. The channel member or members 1 and the plates 2 and 3 thus constitute a box-like compartment closed along the sides and at the lower end, and open at the upper end, such end constituting the feed end, to which the materials or mixture to be screened or separated are delivered.

The upper ends of the channel member 1 are preferably cut away or bevelled as indicated at 6, Figures 1 and 3, and the top plate 3 extends only up to the forward ends of such cut away or bevelled portions, so as to form a suitable feed opening for the materials, the top plate preferably being provided at such opening with a splash or directing plate 7, and may be provided at its other edges with upwardly directed flanges 8.

At the lower end of the screening compartment, the bottom plate 2 is provided with two outlet or delivery openings 9 for the undersize materials, and with two outlet or delivery openings 10 for the oversize materials. These openings extend transversely of the screening compartment or water box, as clearly shown in Figure 3, the openings 10 being immediately adjacent the lower end of the compartment, and the openings 9 being immediately above the openings 10.

The delivery openings 9 and 10 communicate with the delivery spouts 11, two of which are shown in the present structure, these spouts being formed as separate castings, the flanges 12 of which are secured to the bottom plate 2 and to the lower flange 4 of the channel member 1 in any suitable manner, as by means of the bolts 13.

Each delivery spout 11 is divided by means of a partition 14, to form an undersize delivery channel 15 which communicates at its upper end with one of the openings 9, and an oversize delivery channel 16 which communicates at its upper end with one of the openings 10. The side walls of each delivery spout converge downwardly as clearly shown in Figures 4 and 5, and at its lower and reduced portion each spout is formed so as to provide separate outlets 17 and 18 for the undersize and oversize materials respectively.

It will, of course, be understood that a single larger delivery spout could be employed instead of the two spouts shown and described. However, it is believed to be more practical to use the two delivery spouts, each one delivering one-half of the undersize material, and one-half of the oversize material.

Within the screening compartment or box above described is arranged a screen member upon which is mounted a screen wire or cloth of suitable mesh according to the requirements of the particular materials to be screened or separated. This screen member, in the form thereof shown, comprises a frame consisting of main side frame members 19 and intermediate frame members or slats 20, shown more particularly in Figures 2 and 3. The side and intermediate members 19 and 20 are secured together in properly spaced relation, by means of spacer blocks 21, and by means of rods 22 extending through openings in the members and spacer blocks and having nuts 23 threaded upon the ends thereof. By means of the nuts 23, which preferably lie within recesses 24 in the frame members 19, the frame parts may be tightly secured together.

The screen wire or cloth 25 is fastened upon the frame 19, 20, 21 by means of the side bars 26 secured, as by means of screws 27, to the side frame members 19, the screen cloth being held at its edges between the bars 26 and members 19, or it may be first secured by tacking to the members 19. The screen cloth at the lower end of the frame does not extend beyond the forward or lower faces of the spacer blocks 21, for a purpose which will later appear. If desired the screen cloth may also be secured by tacking or otherwise to the intermediate frame members or slats 20.

The screen member constructed as above described is inserted loosely in the screening compartment through the open end thereof, the screen wire or cloth occupying a substantially central position between the bottom and top plates 2 and 3 of the compartment. The total height of the members 19 and bars 26 is less than the distance between the walls 2 and 3, so that there is a looseness of fit of the screen member within the screening compartment, for the purpose hereinafter pointed out. The lower ends of the frame members 19 and 20 abut against the end portion of the channel member 1, and thereby position the spacer blocks 21 immediately above the partitions 14 of the delivery spouts 11. Thus the spacer blocks serve also to insure separate communication of the undersize delivery channels 15 with the space below the screen cloth 25, and of the oversize delivery channels 16 with the space above the screen cloth, such communication in the latter case being possible owing to the fact that the screen cloth does not extend beyond the lower or forward faces of the spacer blocks as above mentioned.

The outlet connections and control means therefor for the undersize materials are illustrated in Figures 6 and 7. Attached to the undersize outlets 17 of the delivery spouts are rubber hose connections 28, the lower ends of which are attached to nipples 29 suitably secured in the opposite branches of a reducing connection 30 of Y form, the remaining branch of which has suitably secured therein a single outlet pipe 31. Thus the two streams of undersize material from the delivery spouts 11 are joined and may escape through the single outlet pipe 31 to a suitable place of delivery.

The part of the connection 30 adjacent the outlet pipe 31 is formed to provide a valve seat 32 with which cooperates a valve member 33. A pipe connection 34 extends upwardly from the upper part of the connection 30, and at its upper end communicates with a float chamber or tank 35, within which is pivotally mounted a ball float member 36. A valve rod 37 connected at its lower end to the valve member 33, is connected at its upper end to the ball float member 36 intermediate the ball and the pivot thereof.

It will be understood that the water or other liquid medium introduced into the apparatus with the materials or otherwise, will rise within the pipe 34 and tank 35 to the same level as in the screening compartment, and that the float member 36 acting in accordance with increase or decrease of the water level will effect opening or closing of the valve member 33, to permit or prevent the escape of the water and undersize materials.

The outlet connections for the oversize materials are shown in Figures 8 and 9. Attached to the oversize outlets 18 of the delivery spouts 11 are rubber hose connections 38, the lower ends of which are attached to the branches of a reducing connection 39 of generally similar form to the connection 30 before described. The lower branch of this connection 39 is connected by suitable pipe connections 40 with the lower end of a dewatering cylinder 41 which extends upwardly at a suitable angle, for example, about 45°, with its upper end terminating at a suitable distance above the water level of the apparatus, and provided with a discharge member or spout 42. Within the dewatering cylinder 41 is arranged a screw conveyor 43, which may be rotated in any suitable manner, for example, by means of a pulley 44 secured to its upper end and driven from any suitable source of power. The upper end of the dewatering cylinder 41, and the upper end of the screw conveyor 43 may be supported by means of suitable supports or bearings 45 carried by a conveniently arranged supporting structure or framework 46. The lower end of the screw conveyor 43 may be supported by a suitable bearing member 47 at the lower end of the dewatering cylinder.

Entering the upper part of the connection 39 is a water inlet connection 48 through which water may enter the apparatus, as hereinafter described, the flow being controlled by a suitable valve 49.

With this arrangement the streams of oversize material from the delivery spouts 11 are joined and introduced into the lower part of the dewatering cylinder, the material being carried upwardly in said cylinder by the screw conveyor and ultimately discharged from the upper end thereof.

Associated with the screening compartment is a vibrating means for imparting vibratory movement to such compartment for the purpose of effecting the desired screening or separation of the materials. Any suitable means for effecting the desired vibratory movements of the screening compartment may be employed, but it is preferred to employ an electro-magnetic vibrating means of the kind which is disclosed in Patent No. 1,846,326, issued February 23, 1932. Such vibrating means is illustrated diagrammatically in Figure 6, and in part in Figure 5, and a brief description only will suffice for the purposes of the present invention, reference being had to the said patent for a more complete disclosure of such vibrating means.

The vibrating means comprises a supporting structure consisting of two hollow longitudinal frame members 50, one of which only appears in Figure 6, these frame members being spaced apart a distance to receive in the space between them the screening compartment above described, and being connected by transverse connecting parts 51. Within each of these frame members 50 is disposed a vibrator element 52, preferably composed of a plurality of flat bars shown in Figure 5.

Each vibrator element 52 is securely clamped at its ends to the corresponding frame member 50 by means of bolts 53, and at its central vibratory portion is securely clamped by means of bolts 54 to a bracket member 55. The two bracket members 55 are rigidly connected together by means of a transverse spanner bar or plate 56. Carried by each bracket 55 is an armature 57, and associated with each armature 57 is an electro-magnet 58 mounted on a U-shaped support 59 suitably secured to the frame member 50. The coils of the electro-magnet may be energized by a suitable alternating or mixed current in order that the electromagnet may apply intermittent attractive forces to the armature 57. The repeated attraction of the armatures 57 by the electromagnets 58 will effect repeated deflection of the vibrator elements 52 whereby such elements will be maintained in vibratory movement. These vibrator elements are designed with respect to the vibrating weight of the screening compartment and associated parts so that they are capable of maintaining such vibrating weight in vibratory movement at the same frequency as that of the electromagnetic impulses.

Beneath the screening compartment above described, are provided a plurality of longitudinally extending members or bars 60 shown particularly in Figures 3, 5, 6 and 9. The outer members or bars 60 are suitably secured to the screening compartment, as by means of bolts 61 passing through the bars and through the lower flanges 4 of the channel member or members 1. The intermediate members or bars 60 are suitably secured to the screening compartment, as by means of bolts 62 passing through the bars and through the bottom plate 2, suitable provision being made if necessary for rendering the connections water-tight.

The outer members or bars 60 are supported by and suitably secured, as by means of bolts 63, to the bracket members 55 of the vibrating means, and the intermediate members or bars 60 are suitably secured, as by means of bolts 64, to the spanner bar or plate 56 connecting the said bracket members.

By this arrangement the screening compartment is rigidly supported upon and secured to those parts 55, 56 of the vibrating means which are clamped to and supported by the vibrator elements 52 of such vibrating means, so that the vibratory movements of said vibrator elements are directly imparted to the screening compartment, the vibrator elements and the screening compartment vibrating as a unitary structure.

The vibrating means, and the screening compartment supported thereby, may be supported in any suitable or convenient manner, but it is preferred to support the same in a manner such as to effect a cushioning of any vibration produced, as described in the aforesaid patent. For example, in Figure 6, the frame members 50 are supported by means of rods 65 which rest at their upper ends upon coiled compression springs within casings 66, the latter being in turn supported by rods 67 suitably mounted at their upper ends in a suitable supporting structure 68.

In the operation of the apparatus it will be understood that water or other liquid medium is introduced into the apparatus, for example, through the inlet connection 48, until the water level in the screening compartment reaches a point adjacent the opening at the upper end thereof, through which the materials to be treated are introduced. The water will rise to a similar level within the float tank 35 and within the dewatering cylinder 41.

The materials to be treated, for example, a pulp mixture consisting of all sizes of material, from slimes or fines to sands or even larger particles in a liquid medium, usually water, are introduced by means of a suitable feed pipe, spout, or other feeding means, into the open upper end of the screening compartment, as indicated in Figure 10. The coarser solids settle to the screen cloth by gravity, and those which are too coarse to pass through the screen mesh, gradually work down the inclined screen surface by gravity, possibly assisted somewhat by the vibrating action, and eventually pass down through the openings 10 and oversize channels 16 and connections 38, 39, 40 to the lower part of the dewatering cylinder 41. These coarser solids are carried up through the dewatering cylinder by the action of the screw conveyor 43 and as they pass above the water level in the dewatering cylinder most of the water is drained out of them, and they are ultimately discharged through the discharge member or spout 42.

The slimes and fines which eventually pass through the screen into the part of the screening compartment beneath the screening surface ultimately pass through the openings 9 into the undersize channels 15 of the delivery spouts and downwardly through the hose connections 28 to the connection 30. When the valve member 33 is open, the slimes and fines with a certain amount of water pass out through the outlet pipe 31 to a suitable place of delivery.

The position of the valve member 33 controlling the escape or delivery of the undersize material is controlled in accordance with the water level in the apparatus, it being understood that as the water level increases the valve will be raised by the action of the float member 36, and as the water level decreases the valve will be lowered by the action of the float member. The valve member 33 is usually open, although to a varying extent depending upon the flow of water.

The escape of the water and undersize materials produces, or assists in producing, a slow but positive downward current of water through the screen cloth which carries downward to and through the screen cloth those slimes and fines which would ordinarily settle too slowly, or even remain in suspension.

Excepting for the relatively small amount of water carried out by the sands above the water level in the dewatering cylinder, all of the water escaping from the apparatus must pass out with the fines through the valve controlled outlet 31, it being understood that the water thus escaping is compensated for at least in large part by the water introduced and forming part of the pulp mixture. Consequently there is a positive downward current of water through the screen cloth and through the undersize outlet connections which causes, or assists in causing, the passage of the slimes and fines through the screen cloth.

In order to avoid having a downward current of water in the oversize connections, the water carried out with the sands must be compensated for, and this is effected by having a controlled inflow of water into such oversize connections through the water inlet 48. The amount of water added at this point is to a controlled degree in excess of the amount of water taken out with the sands, so that there is actually produced a slow upward current of water through the connections 38 and oversize channels 16 back into the upper part of the screening compartment. The flow of this backward current of water is so regulated that the only particles which can settle down therethrough by gravity are those particles which are too coarse to pass through the meshes of the screen cloth. Any finer particles having too slow a settling rate to settle through the upward current, are carried back to and forced to remain in the screening compartment until they pass through the meshes of the screen and then follow the downward current of water in the undersize outlet connections.

This introduction of water into the oversize outlet connections thus serves not only to compensate for the water escaping with the sands, but also effects the prevention of any of the fines or undersize material escaping from the screening compartment with the sands or oversize material. In Figure 10 the heavier dotted lines indicate the travel of the oversize material, and the lighter dotted lines indicate the travel of the undersize material.

It will be understood that during the operation of the apparatus the screening compartment is maintained in vibratory movement at a high frequency by the vibrating means before described. The screening compartment is rigidly supported by and connected with the vibrator elements 52, and is vibrated as a unit in a direction substantially perpendicular to the plane of the screening surface 25. This vibratory movement results in a pulsating action of the water upwardly and downwardly through the screen cloth at substantially right angles to its surface, and this pulsating action assist in the passage of the slimes or fines through the meshes of the screen cloth, and keeps the meshes of the cloth clear and free from blinding.

This pulsating action of the water through the screen cloth is caused by the inertia of the loosely supported screen cloth and loosely fitting screen member within the rapidly vibrating body of water. It should be understood that this substantially confined body of water within the screening compartment or water box acts practically as though it were solid, that is the vibration applied to the bottom wall of the compartment is transmitted immediately and without change through the water to the upper wall of the compartment. If the compartment was filled only with air, the upper wall being of sheet metal and having no support except at its edges, would not, due to its inertia, have the true vibration.

When the box is filled with water, however, the upper wall does receive the true vibration directly through the water from the lower wall of the compartment, indicating that the enclosed body of water acts substantially as a solid, and has the same speed and amplitude of vibration as the vibrator elements of the vibrating means.

It can be seen, therefore, that with the screen member loosely fitting within the screening compartment, the screen cloth is loosely supported within the body of water intermediate and parallel to the upper and lower walls of the compartment, and at right angles to the direction of vibratory movement, and its vibration will tend to lag behind the vibration of the water and will have a smaller amplitude.

If the screen cloth had its normal weight or inertia but offered no resistance to the passage of water therethrough, it would have no vibration and would stand still while the water passed through it. If the screen cloth offered its normal resistance to the passage of water through its mesh, but had no weight or inertia, it would vibrate in time with and with the amplitude of the vibration of the water. Obviously neither of these conditions is possible, but a consideration of them leads to the conclusion that the amplitude of vibration and the lag of the vibration of the screen cloth behind that of the water is a function both of the weight or inertia of the cloth and of the mesh of the cloth or its resistance to the passage of water therethrough. The lag is proportional to the inertia or weight of the cloth and to the square of the mesh as expressed in strands per linear inch.

The practical effect of the vibration of the body of water and of the lag in vibration of the screen cloth, is to give a pulsating flow of water back and forth through the screen cloth which assists in the passage of the slimes or fines therethrough and keeps the mesh clean and free from blinding.

From the above description it will be seen that a simple and effective method and apparatus have been provided whereby intermixed materials, and particularly pulp mixtures consisting of all sizes of material, can be readily and efficiently screened or separated. The invention is not, of course, restricted to the particular construction of apparatus hereinbefore described, nor to the particular arrangement of the parts of the apparatus, as the same may be variously modified within the scope of the appended claims.

What we claim and desire to cover by Letters Patent is:—

1. Wet screening apparatus, comprising a screening compartment adapted to contain a substantially confined body of liquid and having upper and lower walls, a perforate screen member within said compartment intermediate the upper and lower walls thereof and mounted for movement toward and away from said walls, said compartment having an opening for the introduction of materials thereinto at one side of said screen member, and vibrating means for imparting vibratory movement to said screening compartment and the body of liquid therein, in a direction substantially perpendicular to the plane of said screen member.

2. Wet screening apparatus, comprising a screening compartment adapted to contain a substantially confined body of liquid and having upper and lower walls and a screen frame having a perforate screen member thereon loosely inserted within said compartment with the screen member intermediate the upper and lower walls thereof and capable of movement toward and away from said walls, said compartment having an opening for the introduction of materials thereinto at one side of said screen member, and vibrating means for imparting vibratory movement to said screening compartment and the body of liquid therein, in a direction substantially perpendicular to the plane of said screen member.

3. Wet screening apparatus, comprising a screening compartment having upper and lower walls and of relatively large length and width and relatively small height adapted to contain a substantially confined body of liquid, means supporting said compartment in a longitudinally inclined position, a perforate screen member within said compartment intermediate the upper and lower walls thereof, and capable of movement toward and away from said walls, said compartment having an opening at the upper end thereof for the introduction of materials thereinto at one side of said screen member, and vibrating means for imparting vibratory movement to said screening compartment and the body of liquid therein, in a direction substantially perpendicular to the plane of said screen member.

4. Wet screening apparatus, comprising a screening compartment adapted to contain a substantially confined body of liquid and having upper and lower walls, a perforate screen member within said compartment intermediate the upper and lower walls thereof and mounted for movement toward and away from said walls, said compartment having an opening for the introduction of materials thereinto at one side of said screen member, and vibrating means constituting the sole support for said screening compartment and arraged to impart bodily thereto vibratory movement in a direction substantially perpendicular to the plane of said screen member.

5. Wet screening apparatus, comprising a screening compartment adapted to contain a substantially confined body of liquid, and having upper and lower walls, a perforate screen member within said compartment intermediate the upper and lower walls thereof and mounted for movement toward and away from said walls, said compartment having an opening for the introduction of materials thereinto at one side of said screen member, and vibrating means including parallel vibrator elements at opposite sides of and wholly supporting said screening compartment and arranged to impart bodily thereto vibratory movement in a direction substantially perpendicular to the plane of said screen member.

6. Wet screening apparatus, comprising a screening compartment adapted to contain a body of liquid and having upper and lower walls, means supporting said compartment in a longitudinally inclined position, a perforate screen member within said compartment intermediate the upper and lower walls thereof and mounted for movement toward and away from said walls, said compartment having an opening at the upper end thereof for the introduction of materials thereinto at one side of said screen member, separate outlet connections for undersize and oversize materials at the lower end of said compartment leading respectively from the parts thereof below and above said screen member, and vibrating means for imparting vibratory movement to said screening compartment and the body of liquid therein, in a direction substantially perpendicular to the plane of said screen member.

7. Wet screening apparatus, comprising a screening compartment adapted to contain a body of liquid and having upper and lower walls, means supporting said compartment in a longitudinally inclined position, a perforate screen member within said compartment intermediate the upper and lower walls thereof and mounted for movement toward and away from said walls, said compartment having an opening at the upper end thereof for the introduction of materials thereinto at one side of said screen member, an outlet connection for undersize materials communicating at the lower end of said compartment with the part thereof below said screen member, means for causing a downward current of liquid in said screening compartment and outlet connection and through said screen member, an outlet connection for oversize materials communicating at the lower end of said compartment with the part thereof above said screen member, and vibrating means for imparting vibratory movement to said screening compartment and the body of liquid therein, in a direction substantially perpendicular to the plane of said screen member.

8. Wet screening apparatus, comprising a screening compartment adapted to contain a body of liquid and having upper and lower walls, means supporting said compartment in a longitudinally inclined position, a perforate screen member within said compartment intermediate the upper and lower walls thereof and mounted for movement toward and away from said walls, said compartment having an opening at the upper end thereof for the introduction of materials thereinto at one side of said screen member, an outlet connection for undersize materials communicating at the lower end of said compartment with the part thereof below said screen member, valve means in said outlet connection and float means controlling said valve means in accordance with the liquid level in said compartment for causing a downward current of liquid in said compartment and outlet connection and through said screen member, an outlet connection for oversize materials communicating at the lower end of said compartment with the part thereof above said screen member, and vibrating means for imparting vibratory movement to said screening compartment and the body of liquid therein, in a direction substantially perpendicular to the plane of said screen member.

9. Wet screening apparatus, comprising a screening compartment adapted to contain a body of liquid and having upper and lower walls, means supporting said compartment in a longitudinally inclined position, a perforate screen member within said compartment intermediate the upper and lower walls thereof and mounted for movement toward and away from said walls, said compartment having an opening at the upper end thereof for the introduction of materials thereinto at one side of said screen member, an outlet connection for undersize materials communicating at the lower end of said compartment with the part thereof below said screen member, an outlet connection for oversize materials communicating at the lower end of said compartment with the part thereof above said screen member, and means communicating with said oversize outlet connection for introducing liquid thereinto to cause a current of liquid within said outlet connection in counterflow to the direction of movement of material within said outlet connection, and vibrating means for imparting vibratory movement to said screening compartment and the body of liquid therein, in a direction substantially perpendicular to the plane of said screen member.

10. Wet screening apparatus, comprising a screening compartment adapted to contain a body of liquid and having upper and lower walls, means supporting said compartment in a longitudinally inclined position, a perforate screen member within said compartment intermediate the upper and lower walls thereof and mounted for movement toward and away from said walls, said compartment having an opening at the upper end thereof for the introduction of materials thereinto at one side of said screen member, an undersize outlet connection communicating at the lower end of said compartment with the part thereof beneath said screen member, an oversize outlet connection communicating at the lower end of said compartment with the part thereof above said screen member, an upwardly inclined dewatering cylinder the lower end of which communicates with said oversize outlet connection, and conveyor means within said cylinder for elevating the oversize material therein and discharging the same at a point above the water level in said compartment, and vibrating means for imparting vibratory movement to said screening compartment and the body of liquid therein, in a direction substantially perpendicular to the plane of said screen member.

11. Wet screening apparatus, comprising a screening compartment having an upper wall and a lower wall and adapted to contain a body of liquid filling the space between said walls, a perforate screen member loosely disposed within said compartment between said upper and lower walls and in a plane parallel thereto, said compartment having an opening for the introduction of materials thereinto at one side of said screen member, and having separate outlets for the undersize and oversize materials, and means for vibrating said screening compartment and the body of liquid therein as a unit, substantially perpendicularly to the plane of said screen member and walls.

12. In a wet screening apparatus, a screening compartment filled with liquid and having upper and lower walls, a perforate screen member disposed within said compartment intermediate the upper and lower walls thereof and mounted for movement toward and away from said walls, and vibrating means associated with said compartment and effective to impart vibratory movement to the same and to the liquid therein, and a different vibratory movement to said screen member.

13. Wet screening apparatus, comprising a container adapted to be filled with liquid confined between the walls thereof, a perforate screen member within said container intermediate the walls thereof and mounted for movement within said body of liquid in a direction perpendicular to its plane, means for introducing and withdrawing materials from said container, and vibrating mechanism connected with said container and operative to vibrate said container and the liquid therein bodily in space in a direction substantially perpendicular to the plane of said screen member.

In testimony whereof we affix our signatures.

JAMES A. FLINT.
F. T. HAZELTINE.